FIG. 1

INVENTORS.
ROBERT L. WILLIAMS
MURRAY D. NELSEN
HOWARD E. CORNER
CARL L. NORRIS
JAMES E. GOODBAR
IVAN L. OLIVER
BY
ATTORNEY

Oct. 18, 1966   C. L. NORRIS ETAL   3,279,522
FUEL FEEDING SYSTEMS

Filed Jan. 2, 1964                                    6 Sheets-Sheet 2

INVENTORS.
ROBERT L. WILLIAMS
MURRAY D. NELSEN
HOWARD E. CORNER
CARL L. NORRIS
JAMES E. GOODBAR
IVAN L. OLIVER

BY
ATTORNEY

INVENTORS.
ROBERT L. WILLIAMS
MURRAY D. NELSEN
HOWARD E. CORNER
CARL L. NORRIS
JAMES E. GOODBAR
IVAN L. OLIVER

BY

ATTORNEY

Oct. 18, 1966   C. L. NORRIS ET AL   3,279,522
FUEL FEEDING SYSTEMS
Filed Jan. 2, 1964   6 Sheets-Sheet 4

INVENTORS.
ROBERT L. WILLIAMS
MURRAY D. NELSEN
HOWARD E. CORNER
CARL L. NORRIS
JAMES E. GOODBAR
BY IVAN L. OLIVER

ATTORNEY

Oct. 18, 1966  C. L. NORRIS ETAL  3,279,522
FUEL FEEDING SYSTEMS

Filed Jan. 2, 1964  6 Sheets-Sheet 5

INVENTORS.
ROBERT L. WILLIAMS
MURRAY D. NELSEN
HOWARD E. CORNER
CARL L. NORRIS
JAMES E. GOODBAR
IVAN L. OLIVER
BY
ATTORNEY

Oct. 18, 1966

C. L. NORRIS ETAL 3,279,522

FUEL FEEDING SYSTEMS

Filed Jan. 2, 1964

INVENTORS.
ROBERT L. WILLIAMS
MURRAY D. NELSEN
HOWARD E. CORNER
CARL L. NORRIS
JAMES E. GOODBAR
IVAN L. OLIVER

BY

ATTORNEY

United States Patent Office 3,279,522
Patented Oct. 18, 1966

3,279,522
FUEL FEEDING SYSTEMS
Carl L. Norris, Huntsville, Ala., Robert L. Williams, Murray D. Nelsen, and Howard E. Corner, Wichita, Kans., James E. Goodbar, Huntsville, Ala., and Ivan L. Oliver, New Orleans, La., assignors to The Boeing Company, Seattle, Wash., a corporation of Delaware
Filed Jan. 2, 1964, Ser. No. 335,236
15 Claims. (Cl. 158—36.4)

This invention relates to fuel feeding systems, and more particularly relates to fuel feeding systems for aircraft.

Conventional aircraft fuel feeding systems have heretofore utilized one or more centrifugal boost pumps located within fuel tank means in an aircraft. The centrifugal boost pumps supply fuel to aircraft engine driven fuel pump means.

An engine driven fuel pump usually has two stages, the first stage being of a centrifugal type and the second stage being of a positive displacement type. The tank mounted boost pump is required to prevent engine pump failure due to cavitation at altitude. The fuel boost pump must be sized to maintain required positive pressure at the engine driven pump inlet during all flight conditions of the aircraft and for all engine throttle settings.

An impeller of a centrifugal pump, such as is usually used as a tank mounted fuel boost pump, is characterized by high impeller tip speeds. High impeller tip speeds cause localized areas of low static pressure which can become so low as to permit the vaporization of a liquid, such as highly volatile jet fuel. This vaporization phase causes fluctuations in pump performance and reduces fuel output pressure. This phenomenon is usually termed cavitation. If pump cavitation is to be prevented due to high fuel temperature and/or high altitudes, some form of tank pressurization must be employed and/or additional power is required for driving the pump. Accordingly, there is a deterioration of boost pump performance with an increase in fuel temperature and/or altitude.

Most large or high performance aircraft presently use centrifugal pumping systems for engine fuel feed and transfer purposes. A principal type of centrifugal pumping system employs electrical motor driven pumps powered with electricity from a constant speed alternator. Other systems utilize hydraulic and pneumatic turbine driven pumps. These systems have a history of malfunctioning and excessive maintenance and therefore cannot achieve a high degree of mission reliability. Accordingly, aircraft utilizing these systems must have dual systems. This often results in use of a combination of different types of centrifugal pumping systems, which require an excessive amount of secondary power.

This invention contemplates the use of ejector pumps in a fuel feeding system for reducing the number of moving parts by the elimination of centrifugal boost pumps, and thereby providing a major improvement in aircraft fuel feeding systems.

This invention further contemplates the use of available fuel from an engine driven pump to drive engine feed and auxiliary tank ejectors. The invention eliminates the tank mounted centrifugal fuel boost pumps through utilization of power available from engine driven fuel pump means.

It is an object of this invention therefore, to provide novel aircraft fuel feeding systems employing ejector pumps and thereby reducing the number of moving parts through the use of ejector pumps for fuel boost and/or transfer purposes. Ejector pumps do not have moving parts that wear out nor do they have lubrication or overheat problems generally associated with a centrifugal type pump and therefore do not require the maintenance procedures associated with centrifugal pumps. The ejector pumps require no wiring, cockpit controls, or circuit breakers, and accordingly eliminate the usual fire hazards associated with electrical boost pumps.

Another object of this invention is the provision of a novel aircraft fuel feeding system employing ejector boost pumps that are simple and reliable. Since an ejector boost pump depends upon an engine driven pump for operation and the engine also depends on the engine driven pump for operation there is no necessity for an auxiliary electrical system for driving a centrifugal boost pump from an external power supply. This lends simplicity and reliability to the invention.

Another object of this invention is the provision of a novel aircraft fuel feeding system utilizing ejector boost pumps positioned in such a manner as to make a maximum amount of fuel in the tanks available for use. Generally, a centrifugal boost pump cannot, at rated performance, pump the last several inches of fuel in a tank mounted installation thereof.

Yet another object of this invention is the provision of a novel fuel feeding system utilizing ejector fuel pumps in such a manner that ejector pump performance increases with altitude since fuel flow required by an engine is reduced by an increase in altitude, and accordingly more fuel is made available as primary flow for operating the ejector boost pumps. In contradistinction thereto the outputs of centrifugal boost pumps decay with altitude because ambient pressure is reduced with an increase in altitude. Accordingly, the fuel boost pressure rises required by the engine pump become greater in order to sustain the minimum pump inlet pressure of the centrifugal boost pump. Normally the fuel required by an engine driven pump for supplying fuel to an engine is essentially constant for a given engine speed regardless of altitude. Thus at an altitude where the engine demands less fuel flow, the excess power necessary for pumping is converted into heat. In a system utilizing ejector boost pumps this power is used for pumping and therefore is not completely converted into heat. However, this excess power is not utilized in a centrifugal boost pump system. Also additional power is required for the centrifugal boost pumps. The ejector system therefore is more efficient since no additional power is required for boost. The ejector system is less costly because of its simplicity. Moreover, there is a saving of weight.

Another object of this invention is the provision of a novel aircraft fuel feeding system, utilizing ejector pumps for engine fuel feeding and intertank transfer purposes, having many advantages over conventional centrifugal type boost pumping systems through the reduction of maintenance, secondary power requirements, weight, or cost, and/or by improved reliability and safety.

The invention further resides in certain novel features of construction, combinations, and arrangements of parts, and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which:

It is to be understood that the invention is not limited to the details of construction and the ararngements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Figure 1:
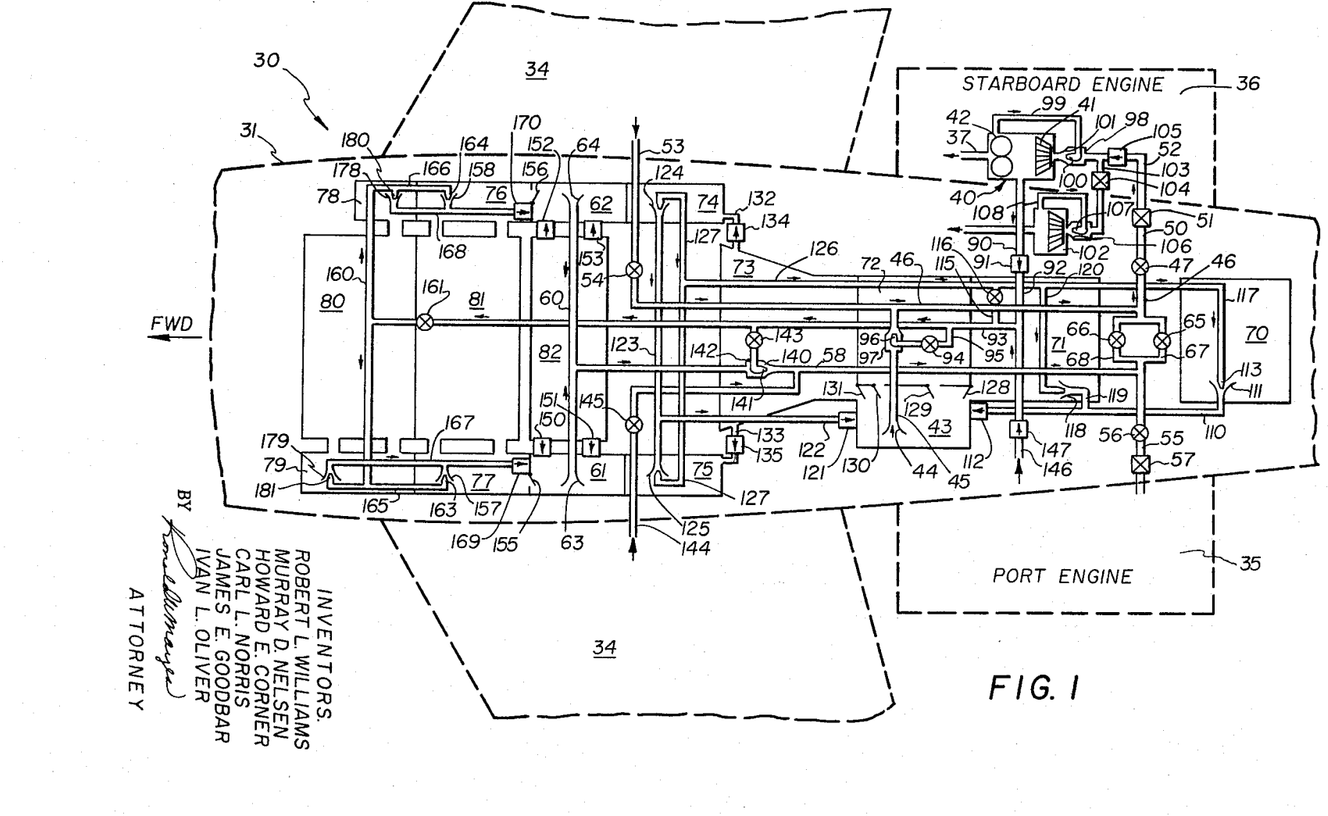
FIG. 1 is a schematic diagram in plan view of a fuel storage, transfer, and feeding system for a high performance aircraft preferably having two engines with afterburners and embodying the invention.
Figure 2:
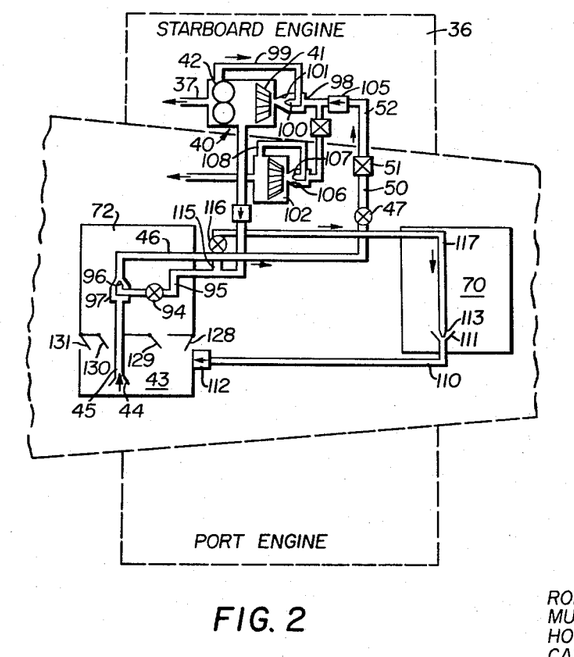
FIG. 2 shows a part of the FIG. 1 system shown separately for purposes of clarity.

Referring to FIGS. 1 and 2, an aircraft indicated generally by the reference numeral 30 comprises a fuselage 31, variable swept wings 34, and an empennage, not shown. In its preferred form, the invention provides new fuel transfer and feeding systems and includes subsystem modifications embodying the invention suited for use on an aircraft having one or more engines. The aircraft 30 is shown with two engines 35 and 36. However, the subsystems will be described in relation to the starboard engine 36 only, since the subsystems for the port engine 35 may be considered substantially the same.

Referring to the engine 36, fuel is pumped to burners therein, not shown, through a fuel line 37 by means of a two-stage pump, indicated generally by the reference numeral 40. The pump 40 has a centrifugal pump first stage 41 and a positive displacement gear pump second stage 42. The pump 40 draws fuel from a main sump 43 via an intake eductor 44, a main branch line 45, a line 46, through a fire shutoff valve 47 in a line 50, a shutoff valve 51 in a line 52 to the intake side of the centrifugal first stage pump 41. The line 46 is also connected via a line 53 to conduct fuel from the starboard wing 34. The line 53 has a motor operated, manual override valve 54 therein. A two-stage pump, similar to the pump 40 and which is not shown, is attached to a line 55 having a fire shutoff valve 56 therein and a motor operated, manual override valve 57 therein. Primary, the port engine 35 draws fuel via the line 55, a main feed line 58, a cross feed line 60, from a port sump 61 and starboard sump 62. The opposite ends of the line 60 have eductors 63 and 64 attached thereto.

It is to be understood that the eductors 44, 63, and 64 are preferably disposed closely facing parallel to the bottom of each of the sumps 43, 61, and 62 respectively. However, the eductors 44, 63, 64 are roughly schematically illustrated as located in their respective sump tanks without any particular orientation being precisely illustrated since such orientation can be varied as desired. One of the advantages of using eductors 44, 63 and 64 in this manner is that most of the fuel can be drawn from the sumps 43, 61, and 62, respectively, during normal flight attitude and thus reduce fire hazard. This also provides greater economy of operation of the aircraft with all the attendant advantages thereof.

The lines 55 and 50 have parallel cross feed valves 65 and 66 in interconnecting parallel lines 67 and 68 respectively, for permitting the desired cross feed of fuel between the main supply lines 46 and 58 to the two engines 36 and 35, respectively. In addition to the main fuel tanks in the wings 34 and the fuselage sumps 43, 61, 62, additional tanks 70, 71, 72, 73, 74, 75, 76, 77, 78, 79, 80, 81 and 82 are provided.

An ejector pump nozzle feedback line 90 is connected to the first stage 41 of the two-stage pump 40 and conducts fuel under pressure therethrough via a check valve 91, a line 92, a main line 93, and a motor operated, manual override valve 94 in a branch line 95, to an ejector 96 of an ejector pump 97 in the main branch line 45. The ejector pump 97 boosts the pressure in the main fuel line 46 that leads to the pump 40.

Referring to the engine 36 in FIGS. 1 and 2, an additional boost in pressure is provided to relieve the pump 40 by a feedback to an ejector pump 98 in the line 52. The pump 98 is adjacent to or at the intake side of the first stage 41 of the pump 40. Fuel is fed from the discharge side of the positive displacement second stage 42 of the pump 40 via a line 99 to a nozzle 100 of the ejector pump 98. The pump 98 has an eductor 101 in the line 52.

The two ejector pumps 97 and 98 are lightweight in construction and eliminate the necessity for electrically driven auxiliary boost pumps in the fuel tanks, and efficiently utilize excess displacement and power of the two-stage pump 40.

A single stage centrifugal afterburner pump 102 has an intake port thereof connected via a line 103 to the line 52 for supplying fuel to an afterburner, not shown, of the engine 36. Preferably a shutoff valve 104 is located in line 103, also a one-way check valve 105 is located in the line 52 immediately up-stream of the connection of the line 103 with the line 52. Preferably the line 103 is connected up-stream of the ejector pump 98 in the embodiment of FIG. 1. Fuel is supplied through the line 103 to the afterburner pump 102 and is boosted along by an ejector pump having an eductor 106 connected into the line 103 adjacent to the pump 102. An ejector pump nozzle 107 is operatively disposed in the eductor 106 and is supplied with fuel under pressure from the pump 102 via a feedback line 108.

Due to the inherent instability and imbalance problem caused by a shift in the center of gravity of a variable sweep wing aircraft and also in view of the well known fuel sloshing problem in a high performance type military aircraft, it is necessary to have a large number of fuel tanks, both in the wings and in the fuselage. The fuel tanks may be referred to as separate and distinct or discrete tanks, sump tanks, and transfer tanks. However it is to be understood that these tanks can be combined or baffled and otherwise varied generally in accordance with the state-of-the-art. For example, fuel is pumped from the auxiliary tank 70 located in the aft portion of the fuselage 31 via a transfer line 110 having an eductor 111 at the intake end thereof in the tank 70 and having the other end thereof supplying fuel to the main sump 43 via a one-way check valve 112 at the discharge end of of the line 110.

An ejector nozzle 113 has its discharge end in operative arrangement with the eductor 111 for forming an ejector pump within the fuel tank 70. The main feedback line 90 supplies fuel under pressure to the nozzle 113 of the ejector pump via the check valve 91, the line 92, a cross feed line 115 having a motor operated, manual override valve 116 therein, and a feedback line 117.

The transfer line 110 has the fuel pressure therein boosted by means of an auxiliary ejector pump 118 in the auxiliary fuel tank 71. The ejector pump 118 comprises an eductor with a nozzle therein. The intake end of a line 119 is connected to the eductor of the pump 118 and feeds fuel to the transfer line 110. The nozzle of the pump 118 is connected to a line 120. The line 120 is connected to the feedback line 117 between the nozzle 113 in the tank 70 and the cross feed line 115 in the tank 71.

Fuel is also pumped into the main sump tank 43 by way of a check valve 121 in a fuel transfer line 122 connected to a cross feed line 123 for drawing fuel from the auxiliary tanks 74 and 75. The tanks 74 and 75 are respectively located in the starboard and port sides of the fuselage 31 near the trailing roots of the wings 34. The cross feed line 123 has ejector pumps 124 and 125 at the opposite ends thereof in the tanks 74 and 75 respectively. The nozzles of the ejector pumps 124 and 125 are supplied with fuel under pressure from the feedback lines 90, 92, 115 and then via a feedback line 126 and a cross feed feedback line 127.

Auxiliary tanks 71, 72 and 73 dump fuel into the sump 43 by means of flap valves 128, 129 and 130, and 131, respectively. Additionally the auxiliary tank 73 continuously replenishes fuel in the auxiliary sump tanks 74 and 75 via lines 132, 133 having check valves 134 and 135 therein, respectively. The check valves 134 and 135 prevent the reverse flow of fuel from auxiliary sump tanks 74 and 75 into the auxiliary tank 73.

The auxiliary sump tanks 61 and 62 supply fuel respectively via eductors 63 and 64 through the cross feed line 60 and the main port engine fuel feed line 58 to the port engine 35 via the line 55, the pump 40, and the line 57; or simultaneously therewith via cross feed lines 67, 68 and the lines 50 and 52 to the pump 40 of the starboard engine 36.

The pressure in the main port side feed line 58 is preferably boosted by means of an ejector pump 140 therein from the main feedback line 93. The ejector pump 140 has a nozzle 141 therein receiving feedback fuel from the main feedback line 93 via a branch feedback line 142 having a motor operated, manual override valve 143 therein. The main port side line 58 also draws fuel from the port wing via a lead line 144 having a motor operated, manual override valve 145 therein. The line 144 is connected to the line 58 downstream of the ejector pump 140. The port engine 35 assists the starboard engine 36 in supplying feedback line pressure to the main feedback line 93 via a line 146 having a one-way check valve 147 therein.

The sumps 61 and 62, from which the port side engine 35 chiefly draws its fuel, are continuously supplied from the auxiliary tank 82 respectively via one-way check valves 150, 151, and 152, 153.

Although the sumps 61 and 62 are additionally supplied with fuel from the tanks 77 and 76, respectively, via dump valves 155 and 156, provision is made for pumping fuel thereto by means of ejector pumps 157 and 158 located in the tanks 77 and 76, respectively. The main pressure feedback line 93 is connected to a cross feed line 160 as controlled by a motor operated, manual override valve 161 located in the line 93. Ejector nozzles 163 and 164 of the pumps 157 and 158 are connected to the opposite ends of the cross feed line 160 via lines 165 and 166, respectively. The pumps 157 and 158 respectively discharge through lines 167 and 168 and one-way check valves 169 and 170 into the sump tanks 61 and 62.

The auxiliary tanks 76 and 77 have common connections with the larger auxiliary tank 81. Similarly the auxiliary tanks 78 and 79 have common connections with the larger auxiliary tank 80. Fuel in the tanks 78 and 79 is transferred to the sump tanks 62 and 61, respectively, by means of ejector boost pumps comprising eductors 178, 179 and nozzles 180, 181, respectively. The eductor 178 is connected to one end of the transfer line 168. The nozzle 180 is connected into the same cross feed line 160 by means of the branch line 166, the same as the nozzle 164. The eductor 179 is connected to one end of the transfer line 167. The nozzle 181 is connected to the branch feedback line 165.

Basically then the port engine 35 draws fuel from the sumps 61 and 62. Sumps 61 and 62 are automatically continuously supplied with fuel from the auxiliary tanks 76, 77, 81 and 82. The auxiliary tanks 78, 79, and 80 are used to supply the sumps 61 and 62 only, and this occurs only when the valve 161 is opened. The fuel pressure in the port engine's main feed line 58 is increased when the feed line ejector pump 140 is put into operation by opening the valve 143. If necessary, the fuel supply to the port engine 35 can be shut off by simply closing the valve 57.

The starboard engine 36 draws its fuel from its main sump tank 43. The tank 43 is automatically continuously supplied with fuel from the tanks 71, 72, and 73. Ejector pumps in the auxiliary tanks 70, 71, 74 and 75 feed fuel to the sump 43 only when the valve 116 is open. The pressure in the starboard engine's main feed line 46 is boosted by the main feed line ejector pump when the valve 94 is open.

The tanks in the port and starboard wings 34 supply fuel to the lines 58 and 46 only when the valves 145 and 54 are opened. In case of fire, fuel to the engines 35 and 36 is cut off by closing fire valves 56 and 47. Thus it can be seen that since the second stage 42 of the pump 40 delivers fuel through the nozzle 100 to the first stage 41 of the pump 40, there is sufficient hydraulic pressure to enable the first stage 41 to be operated with relatively small pressure differential across the first stage 41. This permits the first stage to idle and thus generate little heat energy, as well as reduce its size and weight. Moreover, the major portions of the pump intake line and the pressure boost feedback line supplied by the first stage can be of minimum weight and dimensions because of the lower pressure requirements, with the high pressure lines being kept relatively short.

Figure 3:
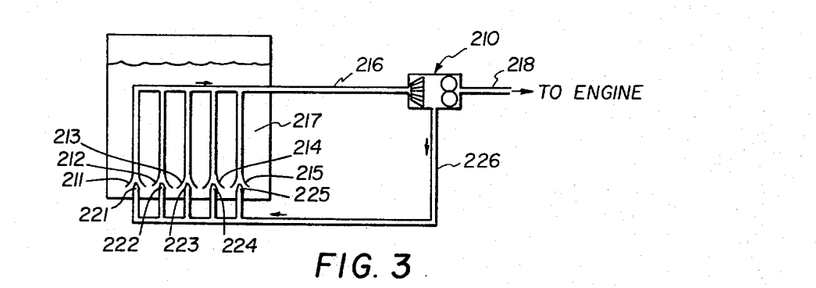
FIGS. 3 through 12 are schematic diagrams of fuel feeding subsystems embodying modifications of this invention.

Referring to FIG. 3, a two-stage pump, indicated generally by refernce numeral 210 and having a centrifugal first stage and a constant displacement second stage, draws fuel by means of a plurality of eductors 211, 212, 213, 214, 215 through an intake line 216 from a fuel tank 217. The pump discharges to an engine by means of a discharge line 218. Nozzles 221, 222, 223, 224, 225 are respectively operatively disposed within the eductors 211, 212, 213, 214, 215 for boosting the pressure in the pump intake line 216 when supplied with fuel under pressure from a feedback line 226 connected to the first stage of the pump 210. The multiple ejector pumps in the fuel tank 217 need not be symmetrically arranged as shown, but if desired can be arranged to draw fuel from remote locations in the tank 217 so that substantially all the fuel in the tank 217 is made available for use. Multiple ejector pumps also have the advantage of possessing the capability of pumping a maximum amount of fuel from a fuel tank that may not be possessed by a single ejector pump or eductor in a given situation.

Figure 4:
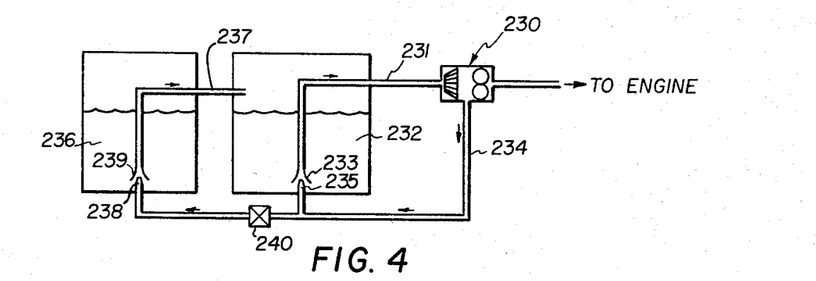

The fuel feeding subsystem shown in FIG. 4 is similar to that shown in FIG. 2, but with the addition of an auxiliary tank and means for transferring fuel from the auxiliary tank to a main tank. More particularly, a two-stage pump, indicated generally by reference numeral 230, draws fuel via an intake line 231 from a main fuel tank 232. The line 231 has an eductor 233 at the intake end thereof. A feedback line 234 has its intake end connected to the first stage of the pump 230 and terminates at a discharge end thereof in an ejector nozzle 235. The nozzle 235 is operatively positioned in the eductor 233 to form an ejector or jet pump located in the tank 232. Fuel from an auxiliary tank 236 is discharged therefrom via a transfer line 237 into the main fuel tank 232. Feedback pressure from the feedback line 234 is supplied via a nozzle 238 in the tank 236 and discharges fuel under pressure into the transfer line 237 having an eductor 239 at its intake end. The nozzle 238 cooperates with the eductor 239 to form an ejector pump. If desired, a shutoff valve 240 can be connected into the line 234 between the ejector nozzles 238 and 235 for taking the auxiliary tank 236 out of operation once the tank has been emptied.

Figure 5:
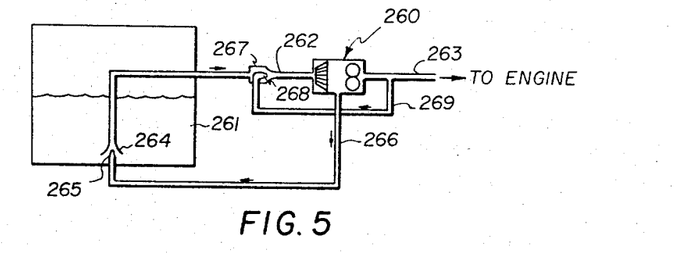
Figure 6:
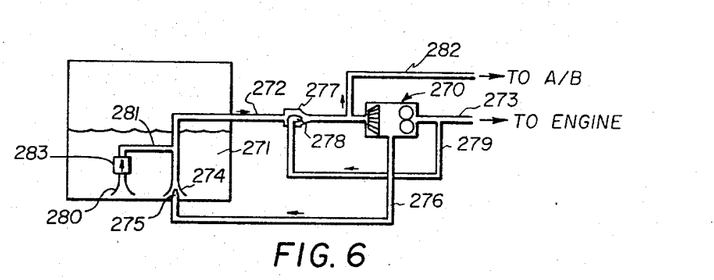

FIG. 5 discloses a further modification of this invention. In this modification a two-stage pump, indicated generally by reference numeral 260 draws fuel from a fuel tank 261 via an intake line 262 and discharges to an engine by means of a discharge line 263. The intake line 262 has an eductor 264 connected to its inner end within the tank 261. An ejector nozzle 265 complements the eductor 264 in the tank 261 and is supplied with fuel from the first stage of the pump 260 by way of a feedback line 266. Fluid pressure in the fuel intake line 262 is further increased by placing therein an ejector pump comprising an eductor 267 and an ejector 268. The ejector 268 is supplied with fuel from the pump discharge line 263 via a second feedback line 269. The embodiment of FIG. 6 is capable of providing a greater fluid pressure within the pump intake line 262 than the embodiment of FIG. 5. Accordingly, the pump 260 is relieved of a further load increment.

The embodiment of FIG. 6 has a two-stage pump, indicated generally by reference numeral 270. The pump 270 has a centrifugal first stage and a constant displacement second stage. The pump 270 draws fuel from fuel tank 271 via an intake line 272 and discharges fuel to an engine by way of a discharge line 273. Fuel is boosted from the tank 271 by means of an ejector boost pump, comprising an eductor 274 connected to an intake end of the line 272 and an ejector nozzle 275 that is supplied with fuel from the first stage of the pump 270 by way of a feedback line 276. The fluid pressure in the intake line 272 is boosted by means of a second ejector pump having an eductor 277 in the line 272 and an ejector nozzle 278 that is supplied with fuel from the discharge line 273 via a feedback line 279. In case the ejector pump in the fuel tank 271 may not be able to supply all of the needs of the engine and its afterburner, an additional eductor 280 is provided in the tank 271. The eductor 280 is connected to the fuel line 272 by means of a branch line 281 in case a greater quantity of fuel is demanded by the engine and/or the after burner. The afterburner, not shown, is supplied with fuel from the line 272 by means of line 281. The afterburner fuel feed line 282 is connected between the pump 270 and the eductor 277 in the line 272. A one-way check valve 283 is provided in the auxiliary intake line 281 in the tank 271 for preventing flow of fuel back into the tank 271 from the line 272 through the line 281.

The pump 270 in FIG. 6 can be of a smaller capacity than would be otherwise necessary by the provision of the eductor 280. At low altitudes, with accompanying higher atmospheric pressures, more fluid can be drawn into the line 272 by the pump 270 from the eductor 280 than will be drawn into the eductor 274. The reason for this is that eductor 280 has a larger effective cross-sectional area than the eductor 274, which has its effective area reduced by the nozzle 275.

Inasmuch as the engine will be almost all of the capacity of the pump 270 at low altitude, very little fuel will be supplied to the ejector nozzles 280 and 274. The quantity of fuel feedback to the nozzles 275 and 278 will increase with altitude since engine efficiency increases with altitude and the rate of fuel consumption will accordingly be reduced for a given engine speed. The fuel supplied to the pump lead line 272 by the eductor 275 and the ejector 275 is made sufficient by empirical means to prevent feedback of any fuel from the line 281 back into the tank 271 via the eductor 274 regardless of the altitude of the aircraft.

Figure 7:
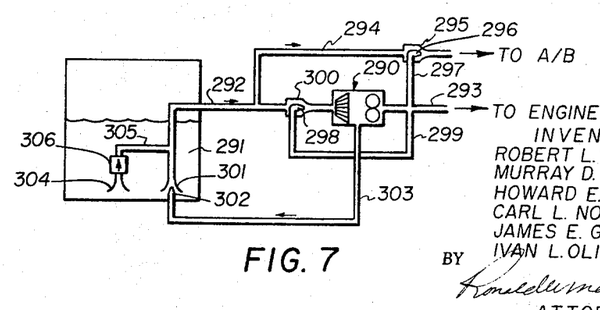

The embodiment of FIG. 7 comprises a two-stage pump, indicated generally by reference numeral 290. The pump 290 has a centrifugal first stage and a constant displacement second stage. The pump 290 draws fuel from a tank 291 via an intake line 292 and discharges to an engine by way of a discharge line 293. An afterburner draws fuel from the line 292 by the way of an intake line 294. Fuel pressure to the afterburner is boosted by means of an ejector comprising an eductor 295 in the line 294 and an ejector nozzle 296 that draws fuel under pressure from the pump discharge line 293 by means of a feedback line 297. Not only does the pump discharge line 293 supply fuel under pressure to the engine and to the ejector nozzle 296 in the afterburner via line 294, but also supplies fuel under pressure to an ejector nozzle 298 via a feedback line 299. The nozzles 298 discharges fuel under pressure into an eductor 300 in the pump intake line 292.

In FIG. 7, a third ejector boost pump comprises an educator 301 connected to an intake end of the pump intake line 292 and an ejector nozzle 302. The nozzle 302 is supplied with fuel under pressure from the first stage of the pump 290 by way of a feedback line. Where a larger quantity of fluid is demanded by both the engine and/or the afterburner at lower altitudes, an auxiliary fuel intake eductor 304 is connected to the intake line 292 by means of a branch line 305. A one-way check valve 306 is placed in line 305 for preventing reverse flow of fluid from the line 292 back into the tank 291. The eductor 304 and the ejector pump 301, 302 cooperate in the manner pointed out, in the embodiment of FIG. 6, with respect to the eductor 280 and the ejector pump 274, 275. At relatively low altitudes and relatively high atmospheric pressures, most of the fuel is drawn to the pump 290 via the eductor 304. However, the role played by the eductor 304 is reduced with increase in altitude and decrease in atmospheric pressure. This phenomenon is compensated by the increasing effectiveness of the ejector pump 301, 302 and 300, 298.

Figure 8:
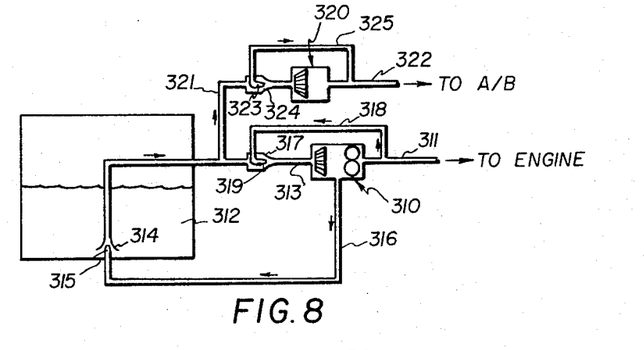

FIG. 8 shows a pump, indicated generally by the reference manual 31. The pump 310 preferably has a centrifugal first stage and a constant displacement second stage. The pump 310 discharges fuel to an engine by a discharge line 311 and draws fuel from a fuel tank 312 by means of an intake line 313. There is an ejector pump comprising an eductor 314 fixed to an intake end of the line 313, and an ejector nozzle 315 that is supplied with fuel from the first stage of the pump 310 by means of a feedback line 316. Pressure in the pump intake line 313 is further boosted by means of an ejector pump comprising an eductor 317 therein, and an ejector nozzle 319 that is supplied with fuel from the pump discharge line 311 by way of a feedback line 318. A single stage centrifugal pump 320 draws fuel from the line 313 by way of an intake line 321 for supplying fuel under pressure to an afterburner by way of a discharge line 322. The fuel pressure in the afterburner pump intake line 321 is boosted by means of an ejector pump comprising an eductor 324 therein and a nozzle 323. Fuel is supplied to the nozzle 323 via a feedback line 325 from the discharge line 322 of the pump 320.

Figure 9:
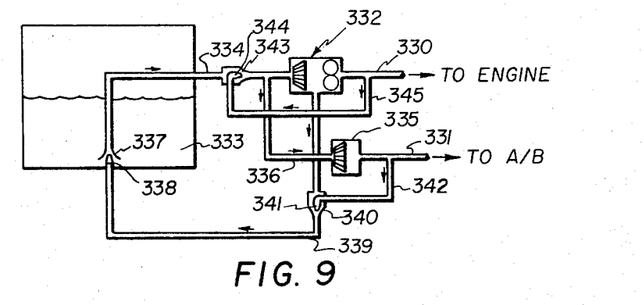

In FIG. 9, an aircraft engine and an aircraft engine afterburner are supplied with fuel from pump discharge lines 330 and 331, respectively. A two-stage pump, indicated generally by reference numeral 332, draws fuel from a tank 333 by means of an intake line 334 and discharges through the line 330 to the aircraft engine. A single stage centrifugal pump 335 draws fuel from the intake line 334 by means of an intake branch line 336 and discharges to the aircraft afterburner by way of the discharge line 331. An ejector pump disposed in the fuel tank 333 comprises an eductor 337 and a nozzle 338. The eductor 337 is connected to an intake end of the line 334. The nozzle 338 is supplied with fuel under pressure from the first stage of the pump 332 by means of a feedback line 339. The pressure in the line 339 is boosted by means of a second ejector pump comprising an eductor 340 in the line 339 and a nozzle 341 supplied with fuel from the afterburner pump discharge line 331 by means of a feedback line 342. The pressure of the fuel supplied to the pump 332 by means of the line 334 is boosted by means of a third ejector pump having an eductor 343 and an ejector nozzle 344. The eductor 343 is connected into the line 334 up-stream of the line 336. The nozzle 344 of the ejector pump is supplied with fuel from the two-stage pump discharge line 330 by means of a feedback line 345.

Figure 10:
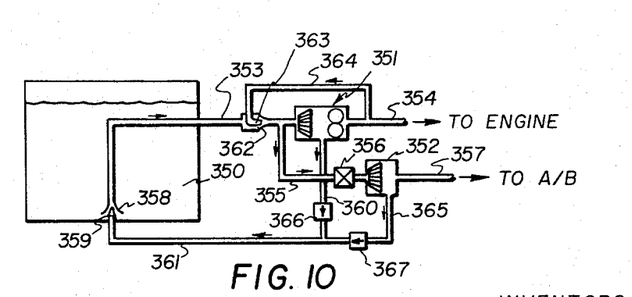

In FIG. 10, a fuel tank 350 has fuel drawn therefrom by means of a two-stage pump, indicated generally by the reference numeral 351, and a single stage centrifugal pump 352. The pump 351 has a centrifugal first stage and a constant displacement second stage.

The two-stage pump 351 in FIG. 10 draws fuel from the fuel tank 350 by means of an intake line 353 and discharges through a discharge line 354 to an engine. An afterburner centrifugal pump 352 draws fuel from the intake line 353 by means of a line 355 having a shutoff valve 356 therein. The pump 352 discharges to an afterburner by means of a discharge line 357. The intake end of the line 353 is provided with an ejector pump comprising an eductor 358 and a nozzle 359. The eductor 358 is connected to an intake end of the line 353.

The nozzle 359 is supplied with fluid from the first stage of the pump 351 by way of lines 360 and 361. The pressure in the intake line 353 is additionally boosted by means of a second ejector pump by means of an eductor 362 in the line 353, and a nozzle 363 that is supplied with fuel from the pump discharge line 354 via a feedback line 364. The afterburner pump 352 supplies fuel to the feedback line 361 by way of a feedback line 365. A one-way check valve 366 in line 360 prevents the feedback of fuel into the first stage of the pump 351. Another one-way check valve 367 in the feedback line 365 prevents the flow of fuel back into the pump 352 from the line 361 or the line 360.

Figure 11:
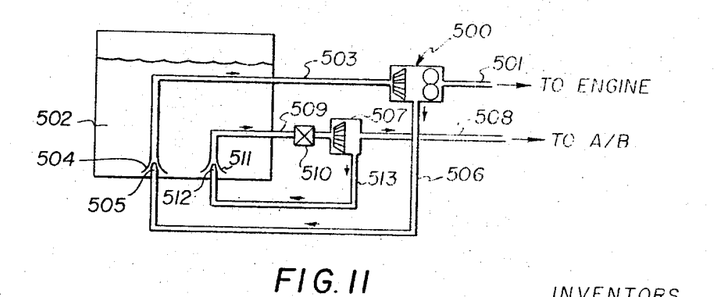

A further modification of this invention is shown in FIG. 11. FIG. 11 shows separate fuel feeding systems for supplying fuel to an engine and to an afterburner of the engine. FIG. 11 shows a two-stage pump, indicated generally by the reference numeral 500, having a centrifugal first stage and a constant displacement second stage discharging to an engine by way of a discharge line 501. The pump 500 draws fuel from a fuel tank 502 by way of an intake line 503. The fuel pressure in line 503 is boosted by means of an ejector pump comprising an eductor 504 and a nozzle 505. The eductor 504 is connected to the intake end of the intake line 503. The nozzle 505 is supplied with fluid under pressure from the first stage of the two-stage pump 500 by way of a feedback line 506.

In FIG. 11, a centrifugal pump 507 feeds fuel to an aircraft engine afterburner by way of a discharge line 508. The pump 507 draws fuel from the tank 502 independent of the engine fuel supply system. More particularly, the pump 507 draws fuel from the tank 502 by means of an intake line 509 having a shutoff valve 510 therein. Pressure in the afterburner pump intake line 509 is boosted by means of an ejector pump located in the fuel tank 502. The ejector pump has an eductor 511 and a nozzle 512. The eductor 511 is connected to the intake end of the line 509. The nozzle 512 is supplied with fuel under pressure from the pump 507 by way of a feedback line 513. Accordingly, in the embodiment of FIG. 11 neither the afterburner pump nor the engine pump is dependent upon the other for assistance. Should one of the pumps fail, the other pump will continue to operate in a normal manner. The shutoff valve 510 in the intake line 509 is considered necessary since usually the engine drives both of the pumps 500 and 507 continuously. The valve 510 is opened only when the aftreburner is desired to be operated.

Figure 12:
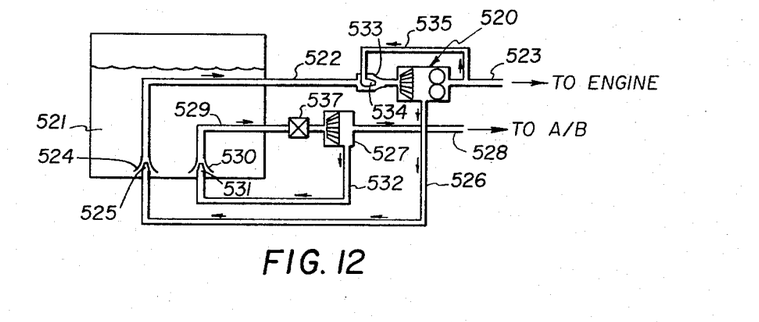

In FIG. 12, a two-stage pump indicated generally by the reference numeral 520, has a centrifugal first stage and a constant displacement second stage. The pump 520 draws fuel from a fuel tank 521 by way of an intake line 522 and discharges fuel to an engine by way of a discharge line 523. Pressure in the fuel intake line 522 is boosted by means of an ejector pump disposed in the tank 521. The ejector pump comprises an eductor 524 and a nozzle 525. The eductor 524 is connected to the intake end of the intake line 522. The nozzle 525 receives fuel under pressure from the first stage of the pump 520 via a feedback line 526.

In the embodiment of FIG. 12, an afterburner for the engine is supplied with fuel by way of a centrifugal pump 527 discharging fuel through a discharge line 528. The pump 527 draws fuel from a tank 521 by way of an intake line 529 having a shutoff valve 537 therein. The pressure in the line 529 is boosted by a fuel tank mounted ejector pump comprising an eductor 530 and a nozzle 531. The eductor 530 is connected to the intake end of the line 529. Fuel is fed to the nozzle 531 from the pump 527 via a feedback line 432. This embodiment of the invention for an engine and its afterburner provides for separate fuel feeding subsystems so that neither is dependent upon the other whereby a breakdown in one subsystem would affect the operation of the other subsystem.

The only difference between the subsystems in FIGS. 11 and 12 resides in the provision of an ejector pump in the intake line 522 of the engine fuel pump 529. The pressure in the intake line 522 of the pump 520 in FIG. 12, is boosted by means of an ejector pump having an eductor 533 and a nozzle 534. The eductor 533 is connected into the line 522. The nozzle 534 is supplied with fuel under pressure from the discharge line 523 via a feedback line 535.

As previously pointed out, all of the eductors disposed within the various fuel tanks preferably face the bottom walls or floors thereof during normal aircraft attitude. Moreover the eductors are spaced an optimum distance from the tank floors, depending upon the sizes of the eductors. Maximum fuel utilization from each tank can be assured by positioning each eductor in a suitable well in its tank floor.

It will be understood that this invention can be modified to adapt it to various circumstances and conditions and it is accordingly desired to comprehend within the purview of this invention such modification as may be considered to fall within the scope of the appended claims.

What is claimed is:

1. A fuel feeding system for an aircraft engine comprising, a fuel tank, first ejector pump means having first eductor means with first nozzle means therein disposed in said fuel tank, a two-stage pump having an intake line, and an outlet line, said pump being located externally of said fuel tank, said pump intake line being connected to said first eductor means, and a first pressure boost feedback line connecting the first stage of said pump to said first nozzle means for boosting the pressure in said pump intake line, second ejector pump means having second eductor means with second nozzle means therein and operatively disposed in said pump intake line, and a second pressure boost feedback line having one end thereof connected into said outlet line of said pump and having the other end thereof connected to said second nozzle means of said second ejector pump means in said pump intake line, and said second stage of said pump delivering fuel to said second nozzle means and to said first stage of said pump at sufficient hydraulic pressure to enable said first stage to be operated in such a manner that any pressure differential across said first stage is relatively small.

2. A fuel feeding system as set forth in claim 1, further comprising, a fuel feed line having an intake end in said pump intake line between said second ejector pump means and said pump and having another end thereof adapted to be connected to an afterburner for supplying fuel thereto.

3. A fuel feeding system as set forth in claim 1, further comprising, a fuel feed line having an intake end in said pump intake line between said first and second ejector pump means outside of said fuel tank and having another end thereof adapted to be connected to an afterburner for supplying fuel thereto.

4. A fuel feeding system as set forth in claim 3, further comprising, third ejector pump means having third eductor means with third nozzle means therein disposed in said afterburner fuel feed line, and a third pressure boost feedback line having an intake end in said outlet line of said pump and having another end thereof connected to said third nozzle means in said third ejector pump means.

5. A fuel feeding system as set forth in claim 3, further comprising, an afterburner pump in said afterburner fuel feed line and having an intake side and a discharge side, third ejector pump means having third eductor means with third nozzle means therein, said third ejector pump means being disposed in said afterbuner fuel feed line on the intake side of said engine driven afterburner pump, and a third pressure boost feedback line having an intake end in said afterburner fuel feed line on the discharge side of said afterburner pump and having another end thereof connected to said third nozzle means of said third ejector pump means.

6. A fuel feeding system as set forth in claim 1, further comprising, a fuel feed line having an intake end in said pump intake line and having another end thereof adapted to be connected to an afterburner for supplying fuel thereto, an afterburner pump in said afterburner fuel feed line and having an intake side and a discharge side, and third pressure boost feedback line means having an intake end connected to the discharge side of said afterburner pump and having another end connected in such a manner as to boost the pressure in said afterburner fuel feed line.

7. A fuel feeding system as set forth in claim 6, wherein said first and third pressure boost feedback line means are connected to said first nozzle means of said first ejector pump means.

8. A fuel feeding system as set forth in claim 6, wherein said another end of said third pressure boost feedback line means is connected to said pump outlet line of said afterburner pump.

9. A fuel feeding system as set forth in claim 6, wherein said third pressure boost feedback line means has said another end connected into said first pressure boost feedback line means, and check valve means in said first and third pressure boost feedback line means between the connection point of said third pressure boost feedback line means and said pumps for permitting one-way fuel passage therethrough.

10. A fuel feeding system as set forth in claim 6, further comprising, third ejector pump means having third eductor means with third nozzle means therein in said first pressure boost feedback line means, and said third pressure boost feedback line means having said another end thereof connected to said third nozzle means of said third ejector pump means.

11. A fuel feeding system as set forth in claim 6, wherein said second ejector pump means having second eductor means with second nozzle means therein in said pump intake line means is disposed between said fuel tank and the connection point with said afterburner fuel feed line.

12. A fuel feeding system as set forth in claim 1 further comprising, eductor means having a bell-shaped mouth disposed in said fuel sump tank, said pump intake line being connected to said eductor means, auxiliary fuel tank means connected to said fuel tank, and valve means permitting the continuous flow of fuel from said auxiliary fuel tank means into said fuel tank and preventing the transgression of fuel therepast back into said auxiliary fuel tank means from said fuel tank.

13. A fuel feeding system for an aircraft engine comprising, a fuel sump tank, eductor means disposed in said fuel sump tank, a two stage fuel pump having intake line means, said fuel pump being located externally of said fuel sump tank, said fuel pump intake line means being connected to said eductor means, first ejector pump means having eductor means and nozzle means, said first ejector pump eductor means being connected into said fuel pump intake line means, first pressure boost feedback line means connecting a first stage of said fuel pump to said first ejector pump nozzle means for boosting the pressure in said fuel pump intake line means, auxiliary fuel tank means, fuel transfer line means connecting said auxiliary fuel tank means to said fuel sump tank, valve means in said fuel transfer line means permitting the flow of fuel from said auxiliary fuel tank means into said fuel sump tank and preventing the flow of fuel from said fuel sump tank through said fuel transfer line means into said auxiliary fuel tank means, second ejector pump means having eductor means and nozzle means disposed in said auxiliary fuel tank means, said second ejector pump eductor means being connected to said fuel transfer line means, second pressure boost feedback line means connecting said first pressure boost feedback line means to said second ejector pump nozzle means for supplying fuel under pressure thereto from said fuel pump, third ejector pump means having eductor means and nozzle means, said third ejector pump means being connected into said fuel pump intake line means adjacent said fuel pump, and third pressure boost feedback line means connecting a second stage of said fuel pump to said third ejector pump nozzle means, and said second stage of said fuel pump delivering fuel to said third nozzle means and to said fuel pump at sufficient hydraulic pressure to reduce any pressure differential across said first stage of said fuel pump to a relatively small value.

14. A fuel feeding system as set forth in claim 1 further comprising, eductor means having a bell-shaped mouth disposed in said fuel tank, a second pump intake line connected to said eductor means and to said first pump intake line in parallel with said first ejector pump, eductor means, and valve means in said second pump intake line for preventing reverse flow in said second pump intake line.

15. A fuel feeding system as set forth in claim 14 further comprising, a fuel feed line having an intake end in said pump intake line and having another end adapted to be connected to an afterburner for supplying fuel thereto, third ejector pump means having eductor means and ejector nozzle means disposed in said afterburner fuel feed line, and a third pressure boost feedback line means, and said third pressure boost feedback line means has an intake end connected to the second stage of said two stage pump.

References Cited by the Examiner
UNITED STATES PATENTS

| | | | |
|---|---|---|---|
| 1,038,201 | 9/1912 | Rateau | 103—5 |
| 2,263,913 | 11/1941 | Bargeboer | 103—5 |
| 2,385,513 | 9/1945 | Helvern et al. | 103—5 X |
| 2,424,285 | 7/1947 | Piccardo et al. | 103—5 |
| 2,435,982 | 2/1948 | Samiran et al. | 158—36.1 |
| 2,660,232 | 11/1953 | Noon et al. | 103—5 |
| 2,812,715 | 11/1957 | Redding et al. | |
| 2,820,413 | 1/1958 | Jacuzzi | 103—113 X |
| 2,953,156 | 9/1960 | Bryant. | |
| 3,043,104 | 7/1962 | Magnus | 103—5 X |
| 3,128,709 | 4/1964 | Arkless et al. | 137—575 X |

FREDERICK L. MATTESON, JR., *Primary Examiner.*

ROBERT A. DUA, PERCY L. PATRICK, *Examiners.*